Sept. 10, 1929. W. DOTY 1,727,970
FLUID BRAKING CONTROL VALVE
Filed March 30, 1928
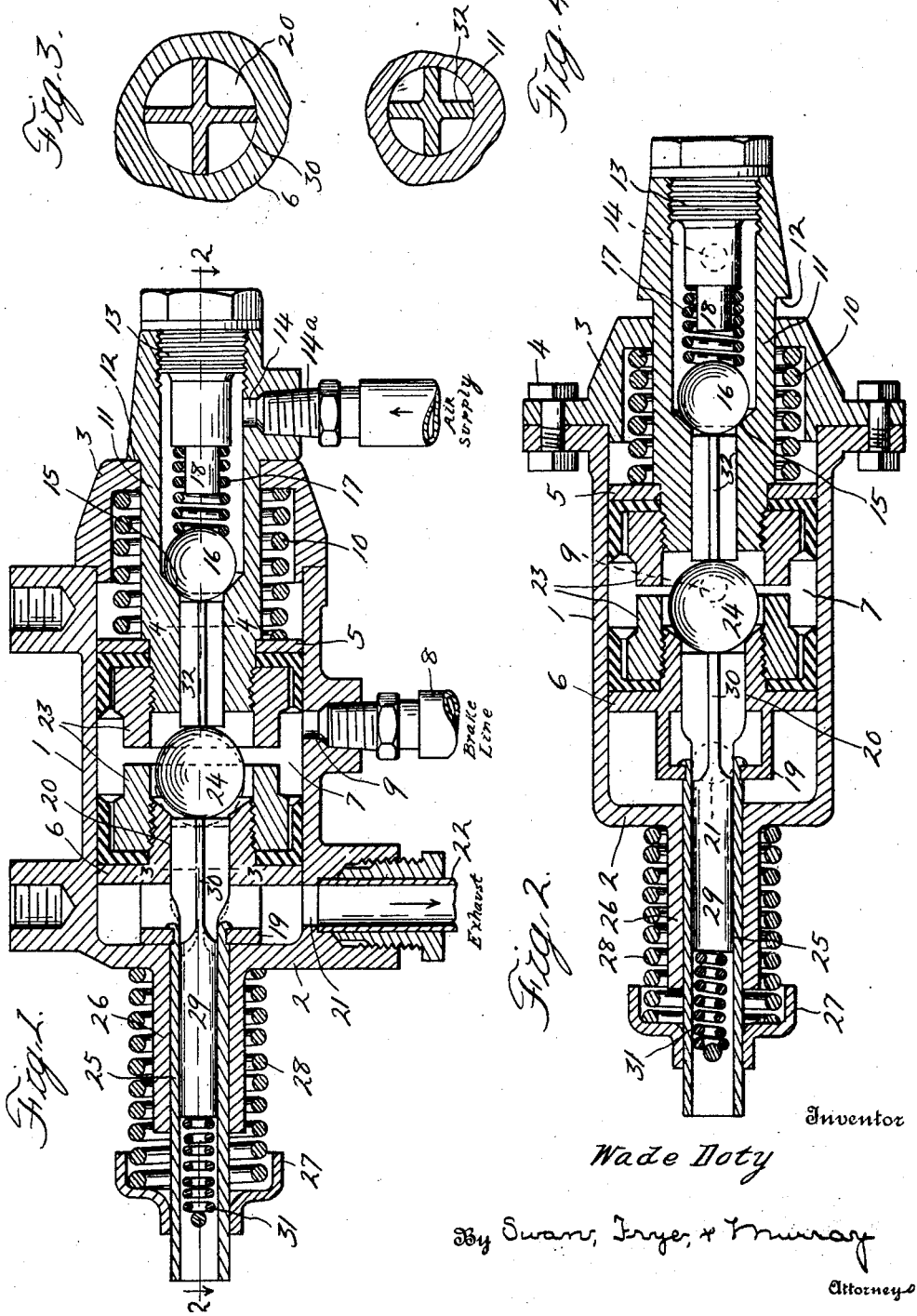
Inventor
Wade Doty
By Swan, Fryer, & Murray
Attorneys Patented Sept. 10, 1929.

1,727,970

UNITED STATES PATENT OFFICE.

WADE DOTY, OF DETROIT, MICHIGAN, ASSIGNOR TO INTERNATIONAL AIR BRAKE COMPANY, OF DETROIT, MICHIGAN, A CORPORATION OF UTAH.

FLUID-BRAKING CONTROL VALVE.

Application filed March 30, 1928. Serial No. 265,854.

This invention relates to fluid controlling valves, and particularly to valves for the control of air and other fluid braking systems. The present construction may be regarded as an improvement upon that disclosed by the pending application of C. A. Sawtelle, Serial No. 212,958, filed August 15, 1927.

It is the object of the invention to provide a valve adapted upon exercise of a braking control to first cut off the normal communication of the brake line with the atmosphere and to then build up a regulable braking pressure in the brake line, and further adapted to completely relieve such braking pressure either immediately or gradually, or to reduce such pressure to a selective extent.

This and various other objects the invention attains by the construction hereinafter described and illustrated in the accompanying drawing, wherein:

Figure 1 is a view of the valve in longitudinal axial section, showing the normal positions which the parts occupy under non-braking conditions.

Figure 2 is a relatively transverse axial section taken on the line 2—2 of Figure 1, showing the positions of the parts when a braking control is being exercised.

Figure 3 is a fragmentary cross-section on the line 3—3 of Figure 1, showing the fluting of a certain pin.

Figure 4 is a similar cross section taken on the line 4—4 of Figure 1, showing another fluted pin.

In these views, the reference character 1 designates a cylindrical casing, integrally closed at one end, as indicated at 2, and having its other end closed by a head 3 of substantially a dome shape, held in place by bolts 4. Within the casing 1, a pair of pistons 5 and 6 are adapted to independently undergo a limited travel, the space between said pistons forming a fluid pressure chamber 7 having constant free communication with a brake line 8 by a port 9 in said casing.

The piston 5 is urged toward the piston 6 by a coiled spring 10 seating against and housed partly within the head 3, its response to said spring being limited by a tubular stem 11 terminally rigidly connected to said piston and sliding through the head 3, and shouldered as indicated at 12 exteriorly of the casing to seat against said head. The outer end of the stem 11 is closed by a screw plug 13 or by some other suitable closure, and a port 14 in the outer portion of said stem communicates with a fitting 14ª which is adapted to admit to said port a braking fluid (such as air) from a pressure tank (not shown) to be delivered by said stem to the pressure chamber 7 through the piston 5. The stem is interiorly annularly shouldered, as indicated at 15 to form a seat for a ball valve member 16, normally held to said seat by a coiled spring 17, abutting against the plug 13. Preferably the latter is formed with a terminal pin 18, serving to position said spring.

The piston 6 is limited in its approach to the casing end wall 2 by a hub 19 upon said piston, and a port 20, formed centrally in said piston and opening laterally in said hub is adapted to place the pressure chamber 7 in communication with an exhaust port 21 opening from the casing, between the piston 6 and end wall 2. A conduit 22 may lead from the port 21 to any desired point.

The pistons 5 and 6 are formed with opposed annular portions 23 which jointly form a cage for a ball valve member 24, controlling the port 20. For exercising control of said valve member and also of the member 16, a tubular stem 25 is rigidly secured to the piston 6, as by riveting said stem terminally to the hub 19, and is slidably extended through the end wall 2 and through a bearing 26 externally integrated with said wall. Beyond said bearing, a collar 27 is mounted fast upon said stem and a spring 28 coiled around said bearing between said collar and the casing acts through said stem to hold the piston 6 normally against the wall 2. Within the stem 25, a pin 29 is slidable and has its inner end portion fluted and enlarged, as indicated at 30, and engaged with the valve member 24 within the port 20. A spring 31 coiled within the outer portion of the stem 25 thrusts the pin 29 against the valve member 24 normally unseating the latter to an extent limited by a fluted pin 32 slidingly mounted in the inner end portion of the stem 11 between the valve members 16 and 24. It is to be noted that the spring 17 is slightly stiffer than the spring 31, so as to hold the ball 16 normally to its seat against the thrust exerted by the spring 31 through the pin 29, ball 24, and pin 32.

In the use of the described valve, de-energization of the brakes (not shown) is normally assured by the communication established between the brake line 8 and the exhaust port 21 through the port 9, pressure chamber 7, and port 20. Unseating of the ball 24 to maintain such communication results from normal retraction of the piston 6 by the spring 28, and from the thrust transmitted to said ball by the spring 31 through the sliding pin 29. In applying the brakes, the stem 25 is actuated into the casing, through any suitable medium. During the initial portion of such actuation, the ball 24 remains stationary, owing to the superior stiffness of the spring 17 to that of the spring 31, and the piston advances to the position shown in dash lines in Figure 1, seating said ball 24 and thus closing off the pressure chamber 7 from the exhaust port 21. Continued advance of the piston 6 acts through the ball 24 and pin 32 to unseat the ball 16, whereupon fluid under pressure flows from the fitting 14 through the stem 11 to the pressure chamber 7 and from the latter into the brake line 8. When pressure in the line 8 and chamber 7 has built up to a predetermined maximum, the spring 10 yields to such pressure, and the piston 5 moves to the right sufficiently to engage the ball 16 with its seat, thereby automatically cutting off any further delivery of fluid to the pressure chamber and brake line. During the interval that pressure is building up in the chamber 7, such pressure of course acts upon the piston 5 in opposition to the controlling thrust applied through the stem 25 and the operator is thus enabled to gauge the applied pressure by the reaction of the fluid against said piston.

A highly desirable feature of the described mechanism is the ability which it gives the operator to reduce the applied braking pressure in proportion to retraction of the control stem 25. Thus when said stem is permitted to retract, carrying the piston 6 with it, the ball 24 tends initially to maintain its position, due to the thrust exerted upon said ball by the spring 31. This permits a discharge from the brake line through the port 9, chamber 7, port 20 and exhaust port 21. Thus by regulating the retraction of the stem 25 and piston 6, the operator may reduce the applied braking pressure to any desired extent, this reduction being maintained by a maintenance of the position of the piston 6. Also, the pressure may be again increased or further reduced, according as said piston is again advanced or permitted to further retract.

Thus it is seen that the described valve affords to the operator a complete control of the braking operation, both as regards building up a desired pressure and reducing or relieving such pressure, and it will further appear that the spring 31 in holding the ball 24 normally from its seat and in assuring immediate unseating of said ball as the stem 25 is retracted, performs a very important function.

When there has resulted a reduction of pressure, predetermined in amount by the retraction of the piston 6, the decrease in the force opposing the spring will permit the piston 5 and its stem 11 to advance adequately to seat the ball 24 responsive to the thrust of the spring 17.

While it will be apparent that the illustrated embodiment of my invention herein disclosed is well calculated to adequately fulfill the objects and advantages primarily stated, it is to be understood that the invention is susceptible to variation, modification and change within the spirit and scope of the subjoined claims.

What I claim is:

1. A control valve for fluid braking systems, comprising a cylindrical casing, a ported piston reciprocatory in said casing, means for delivering a fluid under pressure to said casing, at one side of said piston, said casing having a provision for exhausting such fluid at the other side of said piston, means for connecting a brake line to said casing, a valve member arranged to close the port of said piston, means for positively holding said valve member normally unseated, and means for seating said valve through travel of said piston.

2. A control valve for fluid braking systems, comprising a cylindrical casing, a ported piston reciprocatory in said casing, means for delivering a fluid under pressure to said casing, at one side of said piston, said casing having a provision for exhausting such fluid at the other side of said piston, means for connecting a brake line to said casing, a valve member arranged to close the port of said piston, and means for seating said valve member through travel of said piston, comprising a spring holding said valve member normally unseated.

3. A control valve for fluid braking systems, comprising a cylindrical casing, a ported piston reciprocatory in said casing, means for delivering a fluid under pressure to said casing, at one side of said piston, said casing having a provision for exhausting such fluid at the other side of said piston, means for connecting a brake line to said casing, a valve member arranged to close the port of said piston, means for positively holding said valve member normally unseated, means limiting the unseating travel of said valve member, and a member engaging said piston and extending exteriorly of said casing for actuating said piston toward said limiting means to seat said valve member.

4. A control valve for fluid braking systems, comprising a cylindrical casing, a ported piston reciprocatory in said casing, means for delivering a fluid under pressure to said casing, at one side of said piston, said casing having a provision for exhausting such fluid at the other side of said piston, means for connecting a brake line to said casing, a valve member arranged to close the port of said piston, means for positively holding said valve member normally unseated, means positively urging said piston toward one end wall of the casing, and a member extending through said end wall, engaging said piston to actuate it into seating engagement with said valve member.

5. A control valve for fluid braking systems, comprising a cylindrical casing, a ported piston reciprocatory in said casing, means for delivering a fluid under pressure to said casing, at one side of said piston, said casing having a provision for exhausting such fluid at the other side of said piston, means for connecting a brake line to said casing, a valve member arranged to close the port of said piston, a member engaging said piston, extending exteriorly of the casing for actuating the piston into seating engagement with said valve member, and a spring acting upon said actuating member exteriorly of the casing for urging the piston normally out of seating engagement with said valve member.

6. A control valve for fluid braking systems comprising a cylindrical casing, a pair of ported pistons independently slidable in said casing forming a pressure chamber between said pistons, means at one side of said pressure chamber for delivering a fluid under pressure to said chamber through the port of one of said pistons, a fluid delivery control valve member controlling said port, means at the other side of said pressure chamber for exhausting fluid from said casing, means for delivering fluid to a pressure line from said pressure chamber, a valve controlling the part of the piston separating said fluid pressure chamber from said exhaust means, means normally positively unseating the valve member of the piston nearest the exhaust end of the casing, and a common means for successively seating the exhaust control valve member and for unseating the fluid delivery controlling valve member.

7. A control valve for fluid braking systems comprising a casing, a pair of pistons reciprocatory in said casing to and from each other, jointly forming a fluid pressure chamber in said casing, one thereof being formed with an inlet to and the other with an outlet from said chamber, means for establishing a brake line connection to said chamber, means for delivering a fluid under pressure to said inlet, valve members controlling said inlet and outlet, control means acting upon one of said valve members, and a stem mounted independently of and freely slidable, between said valve members for transmitting control from one to the other thereof.

8. A control valve for fluid braking systems, comprising a casing, a piston slidable in said casing forming a wall of a fluid pressure chamber in said casing and formed with an inlet to said chamber, provision being made for venting said chamber, means for connecting said chamber to a brake line, means for delivering a fluid to said inlet, a valve member controlling the delivery of fluid to said inlet, a stem slidably carried by said piston, within said inlet port and having one extremity loosely engaging said valve member, and means acting upon the other end of said stem for unseating said valve member.

9. In a control valve for fluid braking systems, a casing, a pair of pistons reciprocatory in said casing to and from each other, jointly forming a fluid pressure chamber in said casing, one thereof being formed with an inlet to and the other with an outlet from said chamber, means for establishing a brake line connection to said chamber, means for delivering a fluid under pressure to said inlet, valve members controlling said inlet and outlet, means for normally unseating the outlet valve member, an element extending between the two valve members for unseating the inlet valve member, responsive to seating of the outlet valve member, and means for actuating the outlet forming piston to first seat the outlet valve member and to then unseat the inlet valve member.

10. In a control valve for fluid braking systems, a casing, a piston reciprocatory in said casing forming one wall of a fluid pressure chamber and formed with an outlet from said chamber, a valve member controlling said outlet, actuating means for said piston, a spring arranged exteriorly of said casing acting through said actuating means upon the piston to maintain a normal limiting position of said piston, a relatively light spring normally unseating said valve member and means within said casing acting upon said valve member to seat the same responsive to actuation of said piston from said limiting position.

11. In a control valve for fluid braking systems, a casing, a piston reciprocatory in said casing forming one wall of a fluid pressure chamber and formed with an outlet from said chamber, a valve member controlling said outlet, a member slidable in an end wall of said casing for actuating said piston away from said wall, means carried by said slidable member for normally holding said valve member unseated, and means within said casing for seating said valve member responsive to actuation of said piston.

12. In a control valve for fluid braking systems, a fluid pressure chamber having a yieldable wall formed with an outlet from said chamber, means for delivering a fluid under pressure to said chamber, means for connecting a brake line to said chamber, a valve member controlling said outlet, means for holding said valve member normally unseated, and means for seating said valve member through actuation of said yieldable wall.

13. In a control valve for fluid braking systems, a fluid pressure chamber having a yieldable wall formed with an outlet from said chamber, means for delivering a fluid under pressure to said chamber, means for connecting said chamber to a brake line, a valve member controlling said outlet, actuating means for said yieldable wall comprising a spring normally holding said valve member unseated, and means for seating said valve member responsive to actuation of said yieldable wall.

14. In a control valve for fluid braking systems, a fluid pressure chamber having a yieldable wall and formed in said wall with an outlet from said chamber, means for delivering a fluid under pressure to said chamber, means for connecting a brake line to said chamber, a valve member controlling said outlet, means for holding said valve member normally unseated, means limiting the unseating travel of said valve member, and a member engaging said yieldable wall and extending exteriorly of said pressure chamber for actuating said wall toward said limiting means to seat said valve member.

15. In a control valve for fluid braking systems, a fluid pressure chamber having a yieldable wall formed with an outlet from said chamber, means for delivering a fluid under pressure to said chamber, means for connecting a brake line to said chamber, a valve member controlling said outlet, means for holding said valve member normally unseated, means yieldably acting upon said yieldable wall expansively of said pressure chamber, and means for muscularly actuating said wall, contractively of said chamber to effect seating of said valve member.

16. In a control valve for fluid braking systems, a fluid pressure chamber having a yieldable wall formed with an outlet from said chamber, means for delivering a fluid under pressure to said chamber, means for connecting a brake line to said chamber, a valve member controlling said outlet, means normally unseating said valve member, a member acting upon said yieldable wall to actuate it into seating engagement with said valve member, and a spring acting upon said actuating member and urging said wall normally out of seating engagement with said valve member.

17. In a control valve for fluid braking systems, a fluid pressure chamber having opposed yieldable walls formed respectively with an inlet to and an outlet from said chamber, means for delivering a fluid under pressure to said inlet, means establishing a brake line connection to said chamber, valve members respectively controlling said inlet and outlet, control means acting upon one of said valve members, and a stem mounted independently of said valve members, and freely slidable therebetween for transmitting control from one to the other thereof.

18. In a control valve for fluid braking systems, a fluid pressure chamber having an outlet, and having a yieldable wall formed with an inlet to said chamber, means for admitting a braking fluid to said inlet, a valve member controlling said inlet, a stem slidably carried by said yieldable wall within said inlet and having one extremity loosely engaging said valve member and means acting upon the other end of said stem for unseating said valve member.

In testimony whereof I sign this specification.

WADE DOTY.